(12) United States Patent
Jiang et al.

(10) Patent No.: US 10,813,186 B2
(45) Date of Patent: Oct. 20, 2020

(54) HYBRID LIGHT EMITTING DEVICE

(71) Applicant: XIAMEN ECO LIGHTING CO. LTD., Xiamen (CN)

(72) Inventors: Hong Kui Jiang, Xiamen (CN); Hui Wu Chen, Xiamen (CN); Yan Biao Chen, Xiamen (CN); Wei Liu, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/259,988

(22) Filed: Jan. 28, 2019

(65) Prior Publication Data
US 2020/0245421 A1   Jul. 30, 2020

(51) Int. Cl.
| H05B 33/08 | (2020.01) |
| H05B 45/20 | (2020.01) |
| H05B 45/37 | (2020.01) |
| H05B 45/50 | (2020.01) |
| H05B 47/19 | (2020.01) |

(52) U.S. Cl.
CPC ............. *H05B 45/20* (2020.01); *H05B 45/37* (2020.01); *H05B 45/50* (2020.01); *H05B 47/19* (2020.01)

(58) Field of Classification Search
CPC ............ H05B 33/0815; H05B 33/0845; H05B 33/0872; H05B 37/0245; H05B 37/0272
USPC .................................................. 315/307, 312
See application file for complete search history.

(56) References Cited

U.S. PATENT DOCUMENTS

| 9,018,851 | B1* | 4/2015 | Melanson | H05B 45/44 315/247 |
| 2009/0295776 | A1* | 12/2009 | Yu | H05B 33/0818 345/212 |
| 2012/0200229 | A1* | 8/2012 | Kunst | H05B 33/0815 315/186 |
| 2013/0249420 | A1* | 9/2013 | Lee | H05B 33/0827 315/192 |
| 2014/0009084 | A1* | 1/2014 | Veskovic | H05B 33/08 315/307 |
| 2015/0335519 | A1* | 11/2015 | Lv | A61H 19/44 700/275 |

(Continued)

*Primary Examiner* — Tung X Le
(74) *Attorney, Agent, or Firm* — Chun-Ming Shih; LanWay IPR Services

(57) ABSTRACT

A hybrid light emitting device includes a full-wave bridge rectifier, an AC-to-DC converter, a hybrid illumination module, a luminance control module and a linear constant current circuit. The full-wave bridge rectifier transforms a full sinusoidal wave voltage into a positive half sinusoidal wave voltage. The AC-to-DC converter is electrically coupled to the full-wave bridge rectifier. The AC-to-DC converter transforms the positive wave voltage into a constant DC voltage. The hybrid illumination module includes a plurality of illuminating elements having different or partially same luminance properties. The plurality of illuminating elements are disposed in respective proximities. The luminance control module generates a plurality of control signals that determine the duty cycles of the plurality of illuminating elements. The linear constant current circuit controls duty cycles of the plurality of illuminance elements using the plurality of control signals.

24 Claims, 5 Drawing Sheets

(56) References Cited

U.S. PATENT DOCUMENTS

2016/0128150 A1* 5/2016 Ruan .................. H05B 33/0827
   315/186
2017/0027030 A1* 1/2017 Wang ................. H05B 33/0815

* cited by examiner

HYBRID LIGHT EMITTING DEVICE

BACKGROUND

1. Field of the Invention

The present invention relates to a light emitting device, and particularly relates to a hybrid light emitting device that integrates two levels of driving mechanism.

2. Description of the Prior Art

Conventionally, a light emitting diode (LED) illuminating module may apply multiple LEDs of different illuminating colors, including a primary color temperature, for forming desired illuminance and/or an illuminating color in a mixed manner. However, driving such LED illuminating module requires a complicated circuitry and thereby a high fabrication cost. Such complexity comes from significant junction voltage differences between applied LEDs. Particularly, the LED having the primary color temperature requires an extremely high junction voltage that differs significantly from those of ordinary LEDs.

SUMMARY OF INVENTION

For reducing the abovementioned complexity in driving mixed LEDs, the present invention discloses a hybrid light emitting device. The hybrid light emitting device comprises a full-wave bridge rectifier, an DC-to-DC converter, a hybrid illumination module, a luminance control module and a linear constant current circuit. The full-wave bridge rectifier transforms a full sinusoidal wave voltage into a positive half sinusoidal wave voltage. The DC-to-DC converter is electrically coupled to the full-wave bridge rectifier. The DC-to-DC converter transforms the positive wave voltage into a constant DC voltage. The hybrid illumination module includes a plurality of illuminating elements having different or partially same luminance properties. The plurality of illuminating elements are disposed in respective proximities. The luminance control module generates a plurality of control signals that determine the duty cycles of the plurality of illuminating elements. The linear constant current circuit is electrically coupled to the DC-to-DC converter, the hybrid illumination module and the luminance control module. The linear constant current circuit receives the constant DC voltage for powering up the plurality of illuminating elements. The linear constant current circuit also controls duty cycles of the plurality of illuminance elements using the plurality of control signals.

In one example, the hybrid light emitting device further includes a constant voltage source. The constant voltage source is coupled to the DC-to-DC converter and the luminance control module for providing a high reference voltage. The high reference voltage aids in providing an upper bound voltage level of the constant DC voltage and the plurality of control signals.

In one example, the high reference voltage level is 3.3 volts.

In one example, the full-wave bridge rectifier, the DC-to-DC converter and the constant voltage source share a common ground voltage source.

In one example, the plurality of luminance properties includes different or partially same luminance curves, operating voltage levels, and/or illuminating colors.

In one example, the plurality of illuminating elements are disposed in respective proximities for the purpose of mixing respective illuminating colors when the linear constant current circuit powers up the plurality of illuminating elements.

In one example, the luminance control module further determines a larger duty cycle for control signals that are used for illuminating elements having illuminating colors that help in achieving a desired and mixed illuminating color.

In one example, the luminance control module further determines a shorter duty cycle for control signals that are used for illuminating elements having illuminating colors that do not help in achieving a desired and mixed illuminating color.

In one example, the illuminating colors include blue, green, red, and/or white.

In one example, the luminance control module further determines a shorter duty cycle for control signals that are used for illuminating elements having sharper luminance curves.

In one example, the luminance control module further determines a larger duty cycle for control signals that are used for illuminating elements having smoother luminance curves.

In one example, the luminance control module further determines a shorter duty cycle for control signals that are used for illuminating elements having higher operating voltage levels.

In one example, the luminance control module further determines a larger duty cycle for control signals that are used for illuminating elements having lower operating voltage levels.

In one example, a first terminal of each of the plurality of illuminating elements is respectively and electrically coupled to a different control terminal for being powered up, and is respectively controlled by the linear constant current circuit.

In one example, the plurality of illuminating elements are a plurality of diodes. The first terminal of the plurality of illuminating elements are positive terminals of the diodes.

In one example, the plurality of illuminating elements are a plurality of diodes. The first terminal of the plurality of illuminating elements are negative terminals of the diodes.

In one example, a second terminal of each of the plurality of illuminating elements is electrically coupled to a common terminal of the linear constant current circuit.

In one example, the plurality of illuminating elements are a plurality of diodes. The second terminal of the plurality of illuminating elements are negative terminals of the diodes.

In one example, the plurality of illuminating elements are a plurality of diodes. The second terminal of the plurality of illuminating elements are negative terminals of the diodes.

In one example, the plurality of illuminating elements are light emitting diodes. The hybrid illumination module further includes at least one Zener diode respectively and electrically coupled in series with at least one of the plurality of light emitting diodes.

In one example, each of the at least one Zener diode has a positive terminal respectively and electrically coupled to a negative terminal of each of the at least one light emitting diodes.

In one example, each of the at least one Zener diode has a negative terminal respectively and electrically coupled to a positive terminal of each of the at least one light emitting diodes.

In one example, the luminance control module includes an antenna module and a radio frequency processing chip. The antenna module receives a remote signal that refers settings of duty cycles of the plurality of illuminating elements. The radio frequency processing chip generates the plurality of control signals based on the settings referred by the remote signal.

In one example, the settings referred by the remote signal includes duty cycles determined in response to a luminance curve, an operating voltage level, and/or an illuminating color of the plurality of illuminating elements.

In one example, the antenna module further includes an antenna and a filter circuit. The antenna receives the remote signal. The filter circuit is coupled to the antenna for filtering off noises within the remote signal. The filter circuit includes an inductor and a capacitor. The inductor has a first terminal for receiving the remote signal. The inductor also has a second terminal coupled to the radio frequency processing chip for forwarding the remote signal. The capacitor has a first terminal coupled to the first terminal of the inductor and a second terminal coupled to ground.

These and other objectives of the present invention will no doubt become obvious to those of ordinary skill in the art after reading the following detailed description of the preferred embodiment that is illustrated in the various figures and drawings.

DETAILED DESCRIPTION

As mentioned, for reducing complexity of a conventional LED module that drives multiple LEDs, the present invention discloses a hybrid light emitting device that utilizes a first level of constant voltage topology and a second level of linear constant current control.

Figure 1:
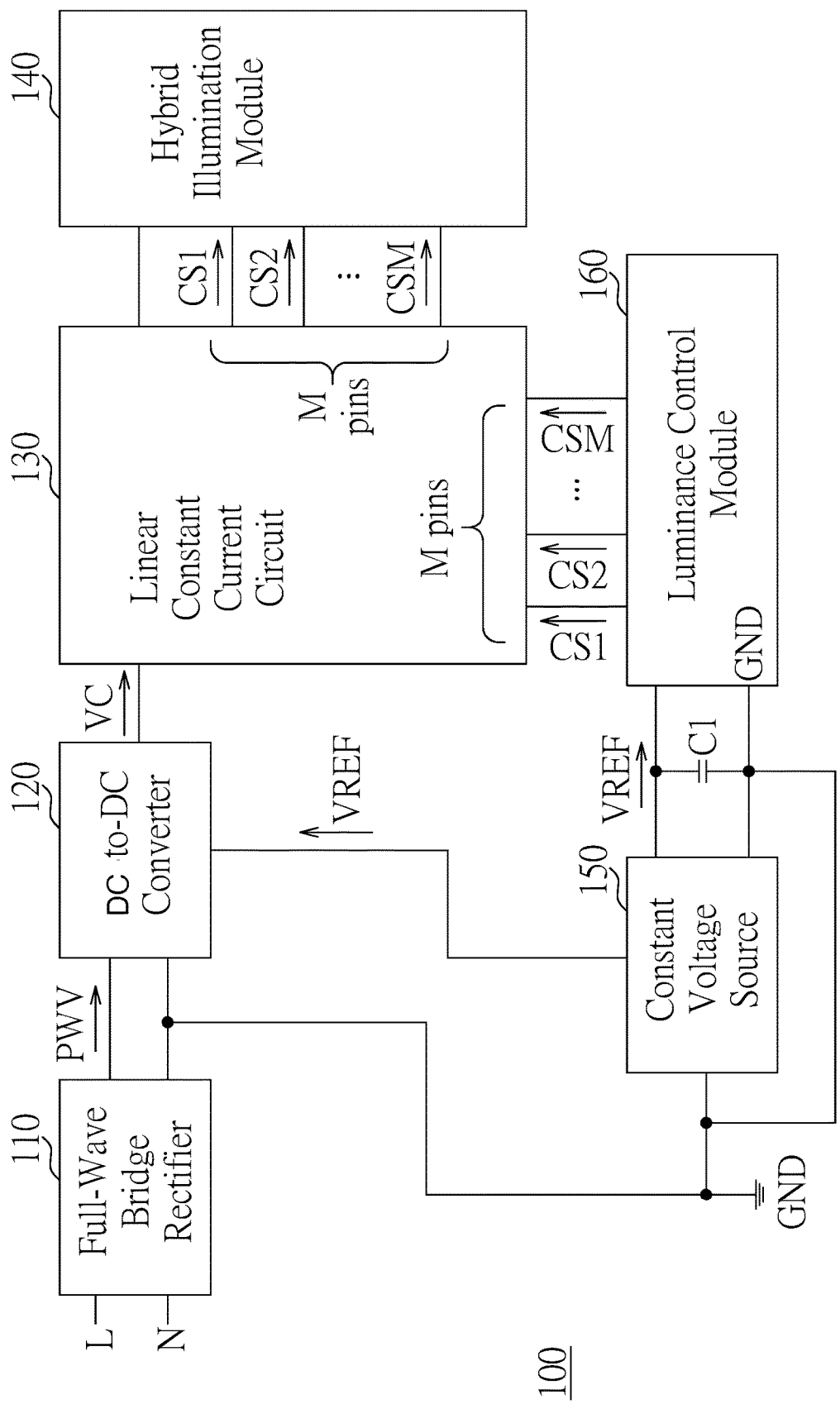
FIG. 1 illustrates a hybrid light emitting device according to one embodiment of the present invention.

FIG. 1 illustrates a hybrid light emitting device 100 according to one embodiment of the present invention. The hybrid light emitting device 100 includes a full-wave bridge rectifier 110, an DC-to-DC converter 120, a linear constant current circuit 130, a hybrid illumination module 140, and a luminance control module 160. Optionally, the hybrid light emitting device 100 may further include a constant voltage source 150 for better voltage modulation.

The full-wave bridge rectifier 110 may receive an external AC voltage having a full sinusoidal wave via terminals L and N. The full-wave bridge rectifier 110 may also transform the full sinusoidal wave of the external AC voltage into a positive half sinusoidal wave, i.e., transform the external AC voltage into a positive half sinusoidal wave voltage PWV. More particularly, the positive half sinusoidal wave turns all negative wave patterns of the full sinusoidal wave into positive wave patterns.

The DC-to-DC converter 120 is electrically coupled to the full-wave bridge rectifier 110 for receiving the positive wave voltage PWV. The DC-to-DC converter 120 may also transform the positive wave voltage PWV into a constant DC voltage VC.

Figure 2:
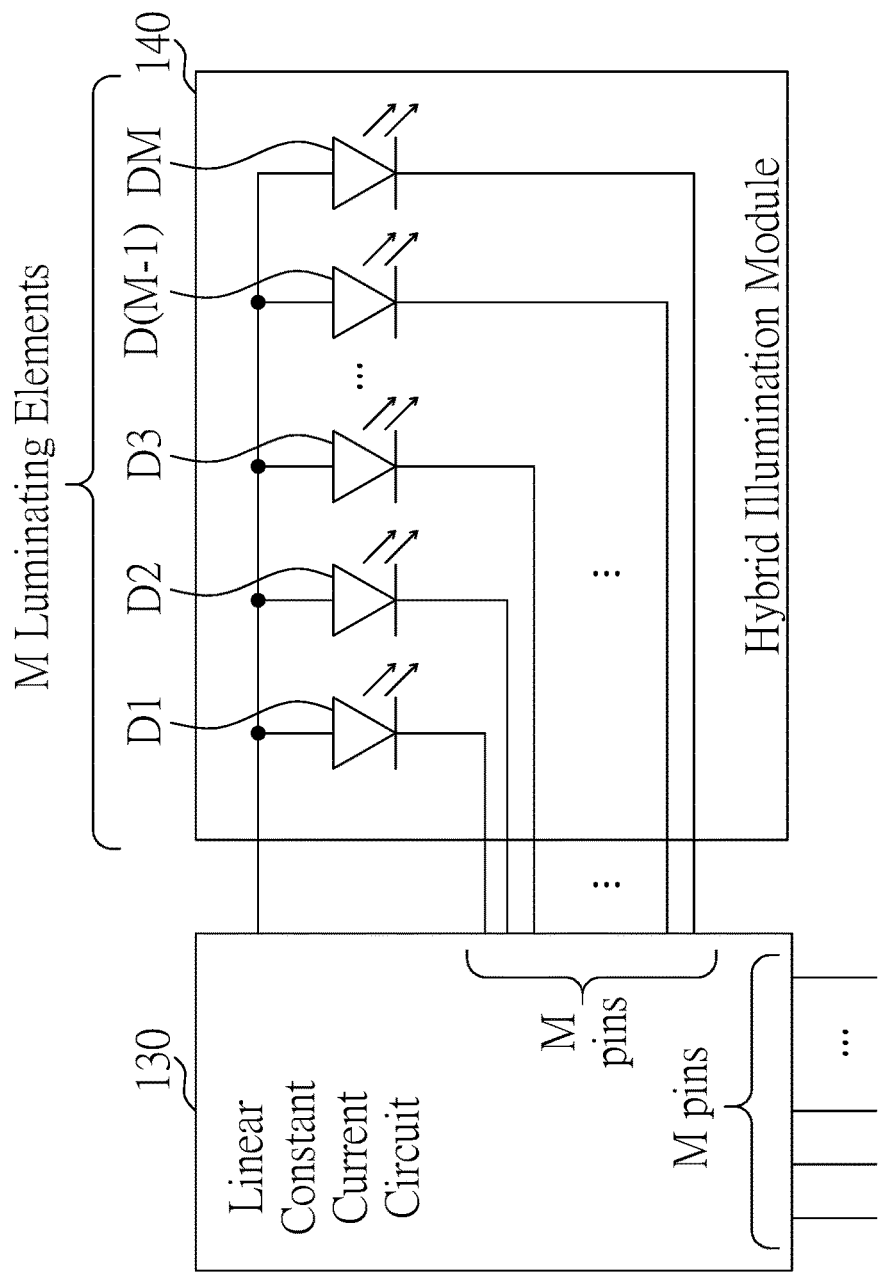
FIG. 2 illustrates a detailed diagram of the linear constant current circuit and the hybrid illumination module shown in FIG. 1 according to one embodiment of the present invention.

The hybrid illumination module 140 includes M illuminating elements D1, D2, . . . , D(M−1) and DM as will be shown in FIG. 2, where M is a positive integer. The plurality of illuminating elements may have different or partially same luminance properties. Also, the plurality of illuminating elements are disposed in respective proximities for mixing respective laminating colors and/or luminance. With the aid of such proximities among the plurality of illuminating elements, the hybrid illumination module 140 is capable of generating a hybrid color and/or hybrid luminance.

The luminance control module 150 may generate M control signals CS1, CS2, . . . , CSM that respectively determine the duty cycles of the plurality of illuminating elements D1, D2, . . . , DM in order. In some examples, the luminance control module 150 generates the M control signals CS1, CS2, . . . , CSM according to respective luminance properties of the M illuminating elements D1, D2, . . . , DM.

The linear constant current circuit 130 is electrically coupled to the DC-to-DC converter 120, the hybrid illumination module 140 and the luminance control module 160. The linear constant current circuit 130 may receive the constant DC voltage VC for powering up the M illuminating elements D1, D2, . . . , DM. The linear constant current circuit 130 may also control duty cycles of the plurality of illuminance elements D1, D2, . . . , DM using the M control signals CS1, CS2, . . . , CSM. Particularly, the linear constant current circuit 130 adjusts the output current to the hybrid illumination module 140 by following a linear curve. Also, the linear constant current circuit 130 maintains the output current to be constant while not adjusting the output current.

The constant voltage source 150 is coupled to the DC-to-DC converter 120 and the luminance control module 160 for providing a high reference voltage VREF. The high reference voltage VREF aids in providing an upper bound voltage level of the constant DC voltage VC and the M control signals CS1, CS2, . . . , CSM.

In one example, the high reference voltage VREF has a voltage level of 3.3 volts.

In one example, the full-wave bridge rectifier 110, the DC-to-DC converter 120 and the constant voltage source 150 share a common ground voltage source GND, for example, by connecting respective ground terminals.

FIG. 2 illustrates a detailed diagram of the linear constant current circuit 130 and the hybrid illumination module 140 according to one embodiment of the present invention. The linear constant current circuit 130 may be implemented using a single current processing chip. The hybrid illumination 140 includes M illuminating elements D1, D2, D3, . . . , D(M−1), DM as mentioned above. For mixing luminance properties of the M illuminating elements D1, D2, D3, . . . , D(M−1), DM to achieve a desired luminance property of the hybrid illumination module 140 while being powered up by the linear constant current circuit 130, the M illuminating elements D1, D2, D3, . . . , D(M−1), DM are disposed in respectively proximities.

In some examples, the M luminance properties D1, D2, D3, . . . , D(M−1), DM includes different or partially same luminance curves, operating voltage levels, and/or illuminating colors.

A luminance curve of an illuminating element indicates a function that associates an inputted operating current and/or operating voltage with an outputted luminance. By disposing the M luminance properties D1, D2, D3, . . . , D(M−1), DM in respective proximities, a combination of luminance curves of the M luminance properties D1, D2, D3, . . . , D(M−1), DM can be inducted, such that a required luminance of the hybrid illumination module 140 can be more easily achieved.

In one example, the luminance control module 160 determines a shorter duty cycle for an illuminating element having a sharper curve. Such that the illuminating element can be better prevented from being damaged by an instantly-increasing input voltage or input current. Similarly, the luminance control module 160 may also determine a larger duty cycle for an illuminating element having a smoother curve. In this way, the illuminating element can be better prevented from insufficient luminance.

Similarly, different types of illuminating elements may have different operating voltages, i.e., junction voltages. For appropriately manipulating the M illuminating elements D1, D2, D3, . . . , D(M−1), DM simultaneously under such difference of operating voltages, the hybrid illumination module 140 requires one terminal of each of the M illuminating elements D1, D2, D3, . . . , D(M−1), DM to be electrically coupled together, and requires that the other terminal of each of the M illuminating elements D1, D2, D3, . . . , D(M−1), DM to be electrically coupled to a different control pin of the linear constant current circuit 130, as illustrated in FIG. 2. Similarly, the abovementioned M control signals CS1, CS2, . . . , CSM can be forwarded to control duty cycles of the M illuminating elements D1, D2, D3, . . . , D(M−1), DM via the M control pins of the linear constant current circuit 130 respectively.

In one example, when the M illuminating elements D1, D2, D3, . . . , D(M−1), DM are light emitting diodes (LEDs), the one terminal that binds the M illuminating elements D1, D2, D3, . . . , D(M−1), DM together may be a positive terminal of the M illuminating elements D1, D2, D3, . . . , D(M−1), DM; and the other terminal that is respectively controlled by the linear constant current circuit 130 is a negative terminal of the M illuminating elements D1, D2, D3, . . . , D(M−1), DM. Similarly, in another example, the one terminal that binds the M illuminating elements D1, D2, D3, . . . , D(M−1), DM together may be a negative terminal of the M illuminating elements D1, D2, D3, . . . , D(M−1), DM; and the other terminal that is respectively controlled by the linear constant current circuit 130 is a positive terminal of the M illuminating elements D1, D2, D3, . . . , D(M−1), DM.

In one example, the luminance control module 160 determines a smaller duty cycle for an illuminating element having a higher operating voltage level, by setting its control signal. Such disposition aims at preventing the illuminating element from being seriously damaged by an over-high operating voltage. Similarly, the luminance control module 160 determines a larger duty cycle for an illuminating element having a lower operating voltage level, by setting its control signal. Such disposition aims at keeping enough luminance of the illuminating element.

Figure 3:
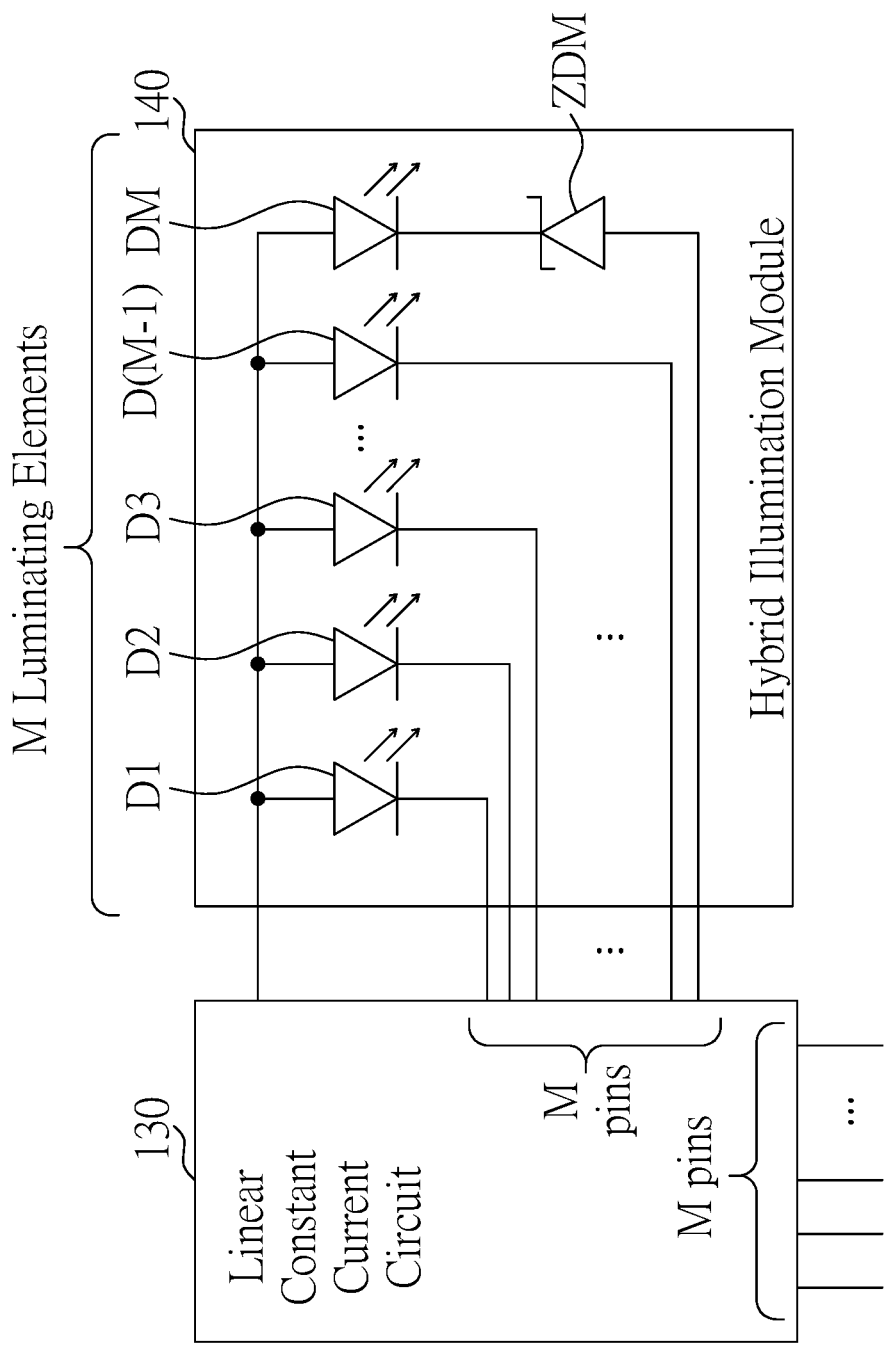
FIG. 3 illustrates an alternative embodiment of the hybrid illumination module shown in FIG. 2 by incorporating at least one Zener diode according to one embodiment of the present invention.

In some examples, for preventing illuminating elements from being damaged by an over-high operating voltage, such illuminating element is further electrically coupled to a Zener diode in series, e.g., a Zener diode ZDM for the illuminating element DM that may have an over-high operating/junction voltage, as illustrated in FIG. 3. More particularly, if a positive terminal of such illuminating element is coupled to positive terminals of the other illuminating elements, the negative terminal of such illustrating element is electrically coupled to a negative terminal of the corresponding Zener diode, and a positive terminal of the corresponding Zener diode is electrically coupled to the linear constant current module 130 for receiving a corresponding control signal. Similarly, if a negative terminal of such illuminating element is coupled to negative terminals of the other illuminating elements, the positive terminal of such illustrating element is electrically coupled to a positive terminal of the corresponding Zener diode, and a negative terminal of the corresponding Zener diode is electrically coupled to the linear constant current module 130 for receiving a corresponding control signal.

In one example, the illuminating colors of the illuminating elements may include blue, green, red, and/or white. Under certain conditions, white may be the primary color temperature for a better luminance control. In one example, the luminance control module 160 determines larger duty cycles for illuminating elements having illuminating colors that help in achieving a desired and mixed illuminating color, by setting respective control signals. In another example, the luminance control module 160 determines smaller duty cycles for illuminating elements having illuminating colors that do not help in achieving a desired and mixed illuminating color, by setting respective control signals.

Figure 4:
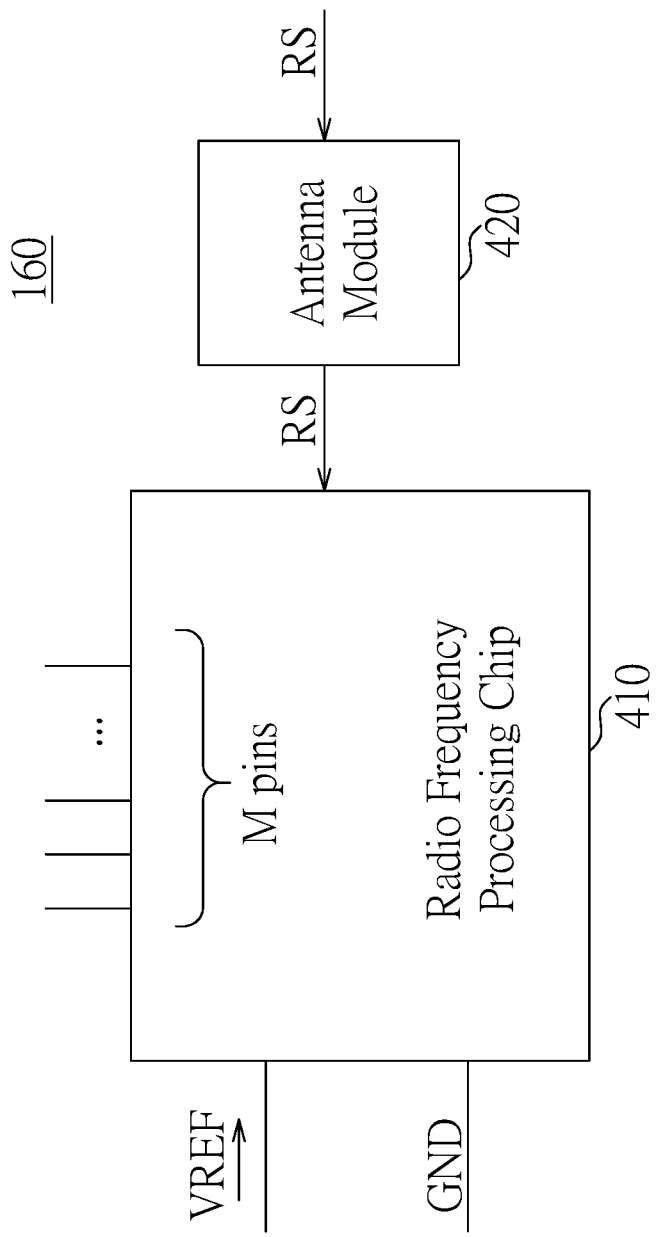
FIG. 4 illustrates a schematic diagram of the luminance control module shown in FIG. 1 according to one embodiment of the present invention.

FIG. 4 illustrates a schematic diagram of the luminance control module 160 according to one embodiment of the present invention. Under certain circumstances, the hybrid light emitting device 100 allows a user to manually adjust his/her desired luminance properties by sending a remote signal RS using a remote control. The luminance control module 160 then receives the remote signal RS and translate the remote signal RS into the abovementioned control signals CS1, CS2, . . . , CSM in response. At last, the luminance control module 160 forwards the M control signals CS1, CS2, . . . , CSM to the linear constant current circuit 130 via M corresponding pins. As exemplified and mentioned above, the settings referred by the remote signal RS may include duty cycles determined in response to a luminance curve, an operating voltage level, and/or an illuminating color of the plurality of illuminating elements.

The luminance control module 160 includes an antenna module 420 and a radio frequency processing chip 410. The antenna module 420 receives the remote signal RS. The remote signal RS refers to settings of duty cycles of the plurality of illuminating elements D1, D2, . . . , DM. And the radio frequency processing chip 410 is capable of translating the referred settings into the M control signals CS1, CS2, . . . , CSM after receiving the remote signal RS from the antenna module 410.

Figure 5:
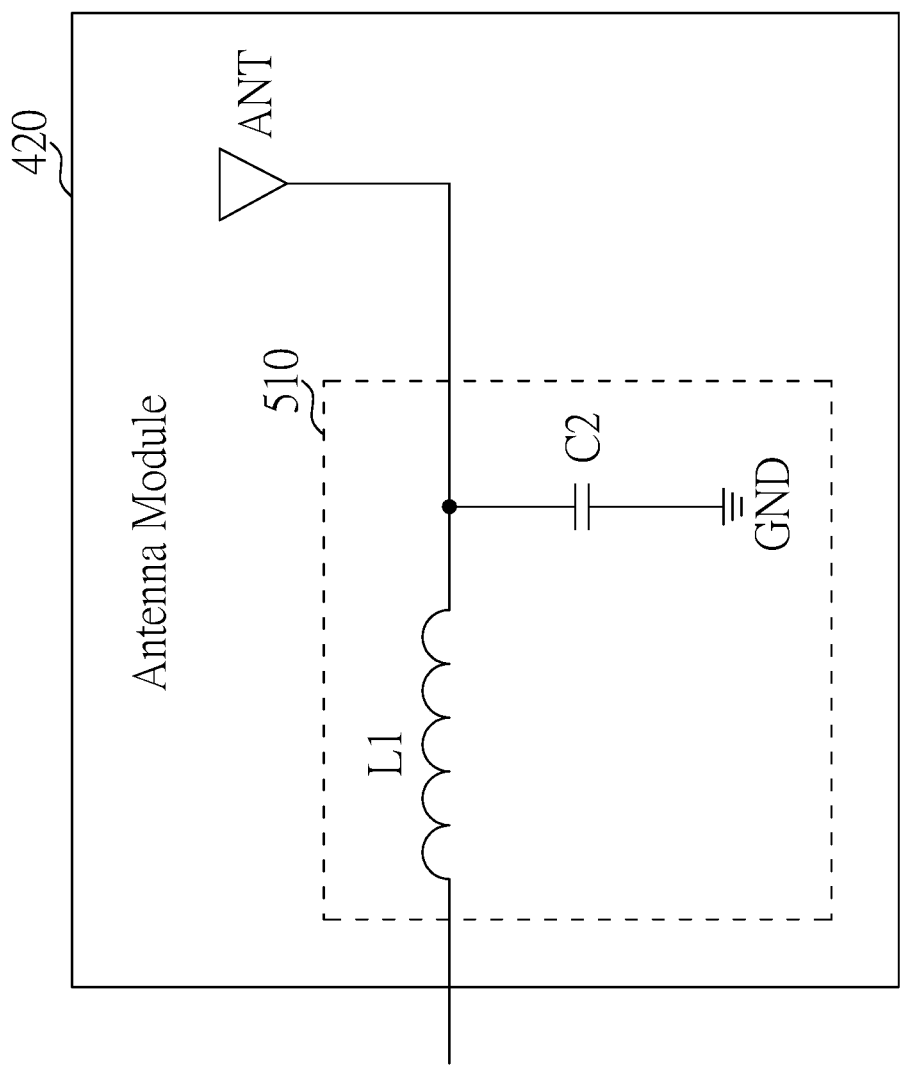
FIG. 5 illustrates a detailed diagram of the antenna module shown in FIG. 4 according to one example of the present invention.

FIG. 5 illustrates a detailed diagram of the antenna module 420 according to one example of the present invention. The antenna module 420 includes a filter circuit 510 and an antenna ANT. The antenna ANT receives the remote signal RS. The filter circuit 510 receives the remote signal RS from the antenna ANT and filters off noises within the remote signal RS.

In one example, the filter circuit 510 includes an inductor L1 and a capacitor C1. The inductor L1 has a first terminal for receiving the remote signal RS. The inductor L1 also has a second terminal coupled to the radio frequency processing chip 410 for forwarding the remote signal RS. The capacitor C1 has a first terminal coupled to the first terminal of the inductor L1. The capacitor C1 also has a second terminal coupled to ground.

As mentioned before, the hybrid light emitting device 100 utilizes a first level of constant voltage topology in the DC-to-DC converter 120 and a second level of linear constant current control in the linear constant current circuit 130. Combination of both the levels effectively accommodates various luminance properties of the plurality of illuminating elements of the hybrid illumination module 140. For example, the combination of the DC-to-DC converter 120 and the linear constant current circuit 130 is capable of integrating operating/junction voltages and/or luminance curves of the plurality of illuminating elements to expand ranges of applied operating/junction voltages and/or luminance curves. The resulting mixed luminance color can thus be adjusted in a wide range. And more important, the hybrid light emitting device 100 of the present invention does not require additionally designed integrated circuit having a high complexity to achieve the abovementioned performance. Such that the hybrid light emitting device 100 of the present invention becomes a significantly better solution than a conventional LED illuminating module that requires a high complexity in design.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A hybrid light emitting device, comprising:
   a full-wave bridge rectifier, configured to transform a full sinusoidal wave voltage into a positive half sinusoidal wave voltage;
   an DC-to-DC converter, electrically coupled to the full-wave bridge rectifier and configured to transform the positive wave voltage into a constant DC voltage;
   a hybrid illumination module, comprising a plurality of illuminating elements having different or partially same luminance properties, the plurality of illuminating elements are disposed in respective proximities;
   a luminance control module, configured to generate a plurality of control signals that determine the duty cycles of the plurality of illuminating elements;
   a linear constant current circuit, electrically coupled to the DC-to-DC converter, the hybrid illumination module and the luminance control module, and configured to receive the constant DC voltage for powering up the plurality of illuminating elements and to control duty cycles of the plurality of illuminance elements using the plurality of control signals; and
   a constant voltage source, coupled to the DC-to-DC converter and the luminance control module for providing a high reference voltage that aids in providing an upper bound voltage level of the constant DC voltage and the plurality of control signals.

2. The hybrid light emitting device of claim 1, wherein the high reference voltage level is 3.3 volts.

3. The hybrid light emitting device of claim 1, wherein the full-wave bridge rectifier, the DC-to-DC converter and the constant voltage source share a common ground voltage source.

4. The hybrid light emitting device of claim 1, wherein the plurality of luminance properties comprises different or partially same luminance curves, operating voltage levels, and/or illuminating colors.

5. The hybrid light emitting device of claim 4, wherein the plurality of illuminating elements are disposed in respective proximities for the purpose of mixing respective illuminating colors when the linear constant current circuit powers up the plurality of illuminating elements.

6. The hybrid light emitting device of claim 4, wherein the luminance control module is further configured to determine a larger duty cycle for control signals that are used for illuminating elements having illuminating colors that help in forming a desired and mixed illuminating color.

7. The hybrid light emitting device of claim 4, wherein the luminance control module is further configured to determine a shorter duty cycle for control signals that are used for illuminating elements that is in forming a desired and mixed illuminating color.

8. The hybrid light emitting device of claim 4, wherein the illuminating colors comprise blue, green, red, and/or white.

9. The hybrid light emitting device of claim 4, wherein the luminance control module is further configured to determine a shorter duty cycle for control signals that are used for illuminating elements having sharper luminance curves.

10. The hybrid light emitting device of claim 4, wherein the luminance control module is further configured to determine a larger duty cycle for control signals that are used for illuminating elements having smoother luminance curves.

11. The hybrid light emitting device of claim 4, wherein the luminance control module is further configured to determine a shorter duty cycle for control signals that are used for illuminating elements having higher operating voltage levels.

12. The hybrid light emitting device of claim 4, wherein the luminance control module is further configured to determine a larger duty cycle for control signals that are used for illuminating elements having lower operating voltage levels.

13. The hybrid light emitting device of claim 1, wherein a first terminal of each of the plurality of illuminating elements is respectively and electrically coupled to a different control terminal for being powered up, and is respectively controlled by the linear constant current circuit.

14. The hybrid light emitting device of claim 13, wherein the plurality of illuminating elements are a plurality of diodes, and the first terminal of the plurality of illuminating elements are positive terminals of the diodes.

15. The hybrid light emitting device of claim 13, wherein the plurality of illuminating elements are a plurality of diodes, and the first terminal of the plurality of illuminating elements are negative terminals of the diodes.

16. The hybrid light emitting device of claim 13, wherein a second terminal of each of the plurality of illuminating elements is electrically coupled to a common terminal of the linear constant current circuit.

17. The hybrid light emitting device of claim 16, wherein the plurality of illuminating elements are a plurality of diodes, and the second terminal of the plurality of illuminating elements are negative terminals of the diodes.

18. The hybrid light emitting device of claim 16, wherein the plurality of illuminating elements are a plurality of diodes, and the second terminal of the plurality of illuminating elements are negative terminals of the diodes.

19. The hybrid light emitting device of claim 1, wherein the plurality of illuminating elements are light emitting diodes; and
   wherein the hybrid illumination module further comprises at least one Zener diode respectively and electrically coupled in series with at least one of the plurality of light emitting diodes.

20. The hybrid light emitting device of claim 19, wherein each of the at least one Zener diode has a positive terminal respectively and electrically coupled to a negative terminal of each of the at least one light emitting diodes.

21. The hybrid light emitting device of claim 19, wherein each of the at least one Zener diode has a negative terminal respectively and electrically coupled to a positive terminal of each of the at least one light emitting diodes.

22. The hybrid light emitting device of claim 1, wherein the luminance control module comprises:
   an antenna module, configured to receive a remote signal that refers to settings of duty cycles of the plurality of illuminating elements; and
   a radio frequency processing chip, configured to generate the plurality of control signals based on the settings referred by the remote signal.

23. The hybrid light emitting device of claim 22, wherein the settings referred by the remote signal comprises duty cycles determined in response to a luminance curve, an operating voltage level, and/or an illuminating color of the plurality of illuminating elements.

24. The hybrid light emitting device of claim 22, wherein the antenna module comprises:
   an antenna, configured to receive the remote signal; and
   a filter circuit coupled to the antenna for filtering off noises within the remote signal, the filter circuit comprises an inductor and a capacitor;
   wherein the inductor has a first terminal for receiving the remote signal and a second terminal coupled to the radio frequency processing chip for forwarding the remote signal; and
   wherein the capacitor has a first terminal coupled to the first terminal of the inductor and a second terminal coupled to ground.

* * * * *